US011970332B1

United States Patent
(12) United States Patent
Peng

(10) Patent No.: US 11,970,332 B1
(45) Date of Patent: Apr. 30, 2024

(54) APPARATUS AND METHOD FOR WASTE PROCESS

(71) Applicant: Hong Peng, Fremont, CA (US)

(72) Inventor: Hong Peng, Fremont, CA (US)

( * ) Notice: Subject to any disclaimer, the term of this patent is extended or adjusted under 35 U.S.C. 154(b) by 0 days.

(21) Appl. No.: 17/460,278

(22) Filed: Aug. 29, 2021

Related U.S. Application Data

(60) Provisional application No. 63/140,936, filed on Jan. 24, 2021, provisional application No. 63/072,170, filed on Aug. 30, 2020.

(51) Int. Cl.
*B65F 1/08* (2006.01)
*B65F 1/00* (2006.01)

(52) U.S. Cl.
CPC .............. *B65F 1/08* (2013.01); *B65F 1/0073* (2013.01); *B65F 2210/18* (2013.01)

(58) Field of Classification Search
None
See application file for complete search history.

(56) References Cited

U.S. PATENT DOCUMENTS

| | | | | | |
|---|---|---|---|---|---|
| 5,170,903 | A * | 12/1992 | Fleming | B65F 1/141 | 220/909 |
| 5,417,338 | A * | 5/1995 | Roy | B65F 1/1646 | 220/543 |
| 6,092,767 | A * | 7/2000 | Schrager | B65F 1/1468 | 248/98 |
| 8,240,626 | B2 * | 8/2012 | Kennedy | B65F 1/1452 | 224/268 |
| 2003/0209549 | A1 * | 11/2003 | Grimes | B65F 1/06 | 220/495.08 |
| 2018/0105357 | A1 * | 4/2018 | Harrison | B65F 1/068 | |
| 2021/0114805 | A1 * | 4/2021 | Rorer, III | B65F 1/08 | |

* cited by examiner

*Primary Examiner* — Steven M Marsh

(57) ABSTRACT

A new apparatus and method of organic waste process for households. The apparatus and method can improve odor, garbage juice and insect issues associated with food scraps.

12 Claims, 15 Drawing Sheets

APPARATUS AND METHOD FOR WASTE PROCESS

CROSS-REFERENCE TO RELATED APPLICATION

This patent application claims priority from U.S. Provisional Patent Application Ser. No. 63/072170 filed on Aug. 30, 2020 and 63/140936 filed on Jan. 24, 2021, which are incorporated by reference herein in its entirety.

BACKGROUND OF THE INVENTION

Nowadays households are required to separate waste before throwing the waste to garbage carts. Usually there are three types of waste for most cities. They are garbage (landfill), recycle and organics (compost). Odor, garbage juice and insects are some problems associated with organic garbage carts for many households. For some households, the organic waste mainly includes food scraps and food soiled papers in most times, and yard waste is occasionally included. The food scraps and soiled papers have a relatively small amount, usually less than five gallons, in one household in a week. However the garbage cart usually has a capacity of 50-100 gallons. Because the garbage cart is too bulky to be cleaned easily and often, and also its lid has a big aperture to cover, odor is always a small or annoying issue especially when the garbage cart has to be kept in a car garage or in house except pickup day. If the cart is put outside of house for a long time, it could attract unwanted insects or animals. So there is a need to have a smaller trash receptacle (garbage can or bin) which is not going to replace the big garbage cart but can be easily fitted in and removed from the garbage cart. Such smaller trash receptacle can have a tightly closed lid and can also be removed and cleaned easily after dumping so that the odor, garbage juice and insect issues can be improved. Furthermore the small trash receptacle can have the advantage of being covered with a trash bag/liner which is not economically affordable for a big garbage cart.

Generally, an organic waste process at home may include a cycle of waste collection in a trash receptacle in a kitchen room, disposing of the collected waste to a big organic garbage cart, putting the garbage cart on street for waste pickup by a garbage truck and then retrieving the garbage cart. As another alternative, the trash receptacle can serve as a garbage cart as well as an organic waste collection receptacle in the kitchen room. Such trash receptacle can be fitted in a garbage cart before a pickup by a garbage truck. Then the empty trash receptacle can be removed from the garbage cart, cleaned or/and covered with an empty bag/liner and put back to operation again in the kitchen room.

For many households, food scraps and soiled papers are collected in countertop pails/bins with or without using compostable bags/liners. Usually the organic waste needs to be disposed to a garbage cart or a big trash bin a few times in a week because the pails/bins have small volume capacities. Without using compostable bags in the countertop pails/bins, if the wet food waste is disposed to the garbage cart directly even with some wrapping newspapers that becoming scarce nowadays, the issues of odor, garbage juice and insects remain. If the wet food waste is disposed to a big trash bin before disposing to the garbage cart, the innovative trash receptacle described in this patent is a better replacement for this big trash bin. With using compostable bags in the countertop pails/bins, usually more compostable bags are needed in a week. Some compostable bags may be broken or leak if not tied carefully during or after the disposing process to the garbage cart, especially in some cases that households may put the garbage cart on street once in two weeks or longer. With the innovative trash receptacle described in this patent, the broken and leak issues in the garbage carts can be improved and even the number of compostable bags/liner usage could be reduced.

Currently, trash receptacles in market can't be simply put in current garbage carts for above needs. Without an apparatus that can attach the small trash receptacle securely to the garbage cart, the trash receptacle will be lost when a garbage truck lifts and turns the garbage cart upside down and shakes it. This invention is to create an apparatus which can securely mount a specific trash receptacle from market or an innovative trash receptacle in a typical garbage cart without any remodeling on the cart. This makes the garbage cart to be also like a capacity-switchable garbage cart. The apparatus can be easily removed from the garbage cart in case a full capacity of garbage cart is needed. The trash receptacle may have a typical volume capacity between two and five gallons and can be securely fitted in and removed from the garbage cart.

SUMMERY OF THE INVENTION

The object of this invention is to develop a new apparatus and method of broadening the choice of organic waste process at home. With this invention, a household can have an innovative fixture which can allow a small trash receptacle to be mounted in a big garbage cart. The fixture provides weight support, mounting and secure mechanism for the matching trash receptacle. And the trash receptacle can be easily fitted in and easily removed from the garbage cart by a user. Apart from the fixture, the new apparatus may also include a specially designed trash receptacle. The trash receptacle and fixture work together to have a secure mechanism to prevent them to drop into a garbage truck when the garbage truck lifts, inverts and shakes the both trash receptacle and garbage cart. To reduce the chance of losing the trash receptacle due to user's negligence, the apparatus can be designed to combine mounting and securing the trash receptacle with the fixture in just one step.

DESCRIPTION OF THE INVENTION

The key part of this invention is the fixture hardware that comprising essentially four features. The first one is its ability of attaching to a garbage cart firmly without a possibility of dropping off when the garbage cart is turned upside down and shaken. The second one is its ability of gripping a trash receptacle, supporting the weight of the trash receptacle and preventing it from dropping off from the garbage cart when it is turned upside down and shaken. The third one is its ability of allowing the trash receptacle to be detached and removed easily from the garbage cart by a user. The fourth one is that fixture itself can be easily removed from the garbage cart. For the trash receptacle, it has features matching the second and third features of the fixture. It means the trash receptacle has a feature that allows the fixture to support its weight and to secure it from the dropping off even when it is upside down. The trash receptacle also has a feature that a user can mount it with the fixture and remove it. Furthermore, the trash receptacle can have an additional feature of a tightly-closed or airtight lid. To focus on innovative device and method, the trash receptacle in the most figures of this application does not include a lid and a rotatable handle. Also devices, parts and elements in figures are usually drawn schematically. In this patent application presentation, word "fixture" is solely for the fixture defined above.

Figure 1A:
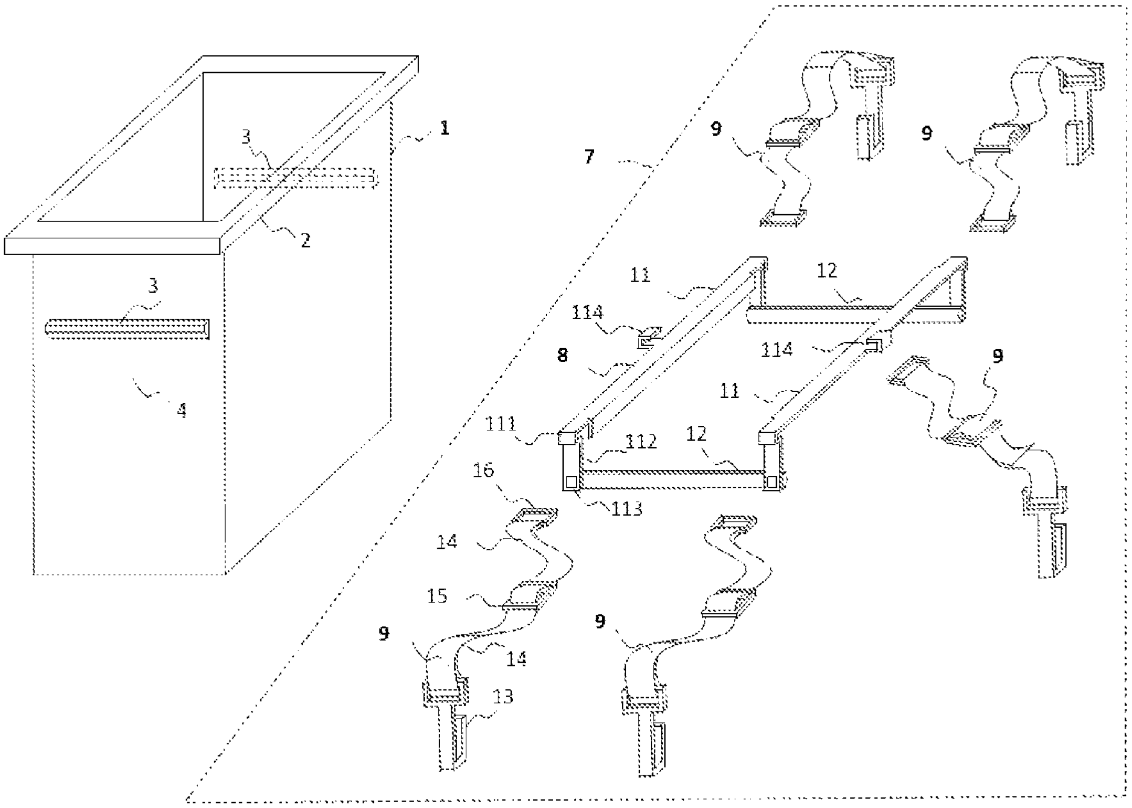
FIG. 1A A schematic diagram of a trash receptacle and its matching fixture.
Figure 1B:
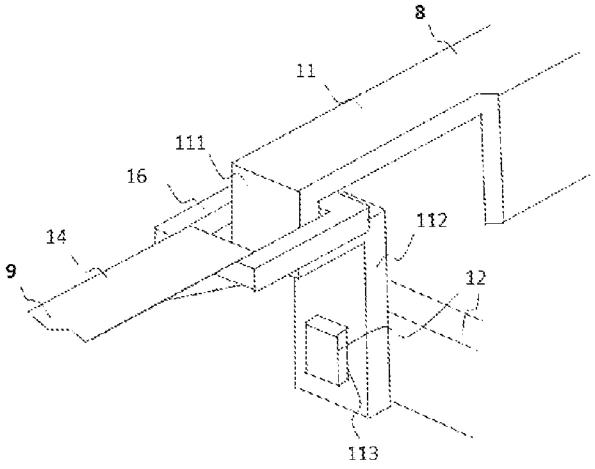
FIG. 1B A schematic diagram showing how a strap loop holder buckle, a weight support bar and secure bar are connected.
Figure 2A:
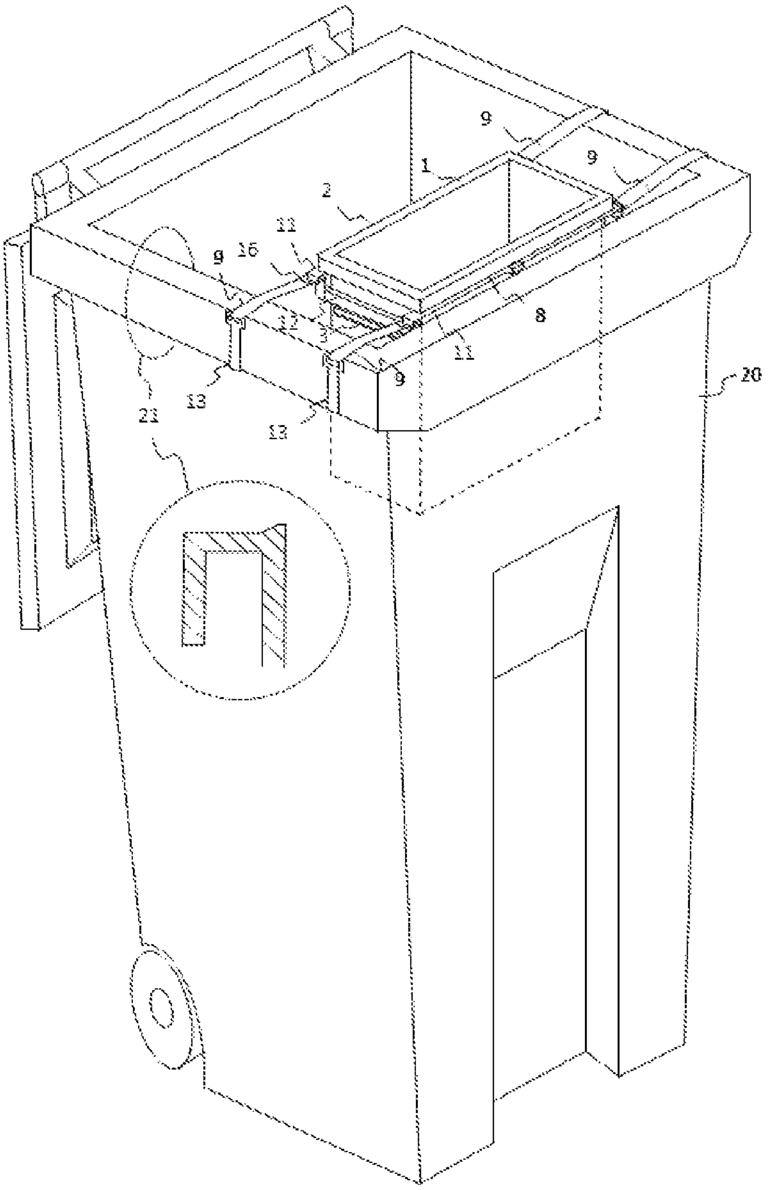
FIG. 2A A schematic diagram of a trash receptacle, a fixture and garbage cart. The trash receptacle is suspended in the garbage cart.
Figure 2B:
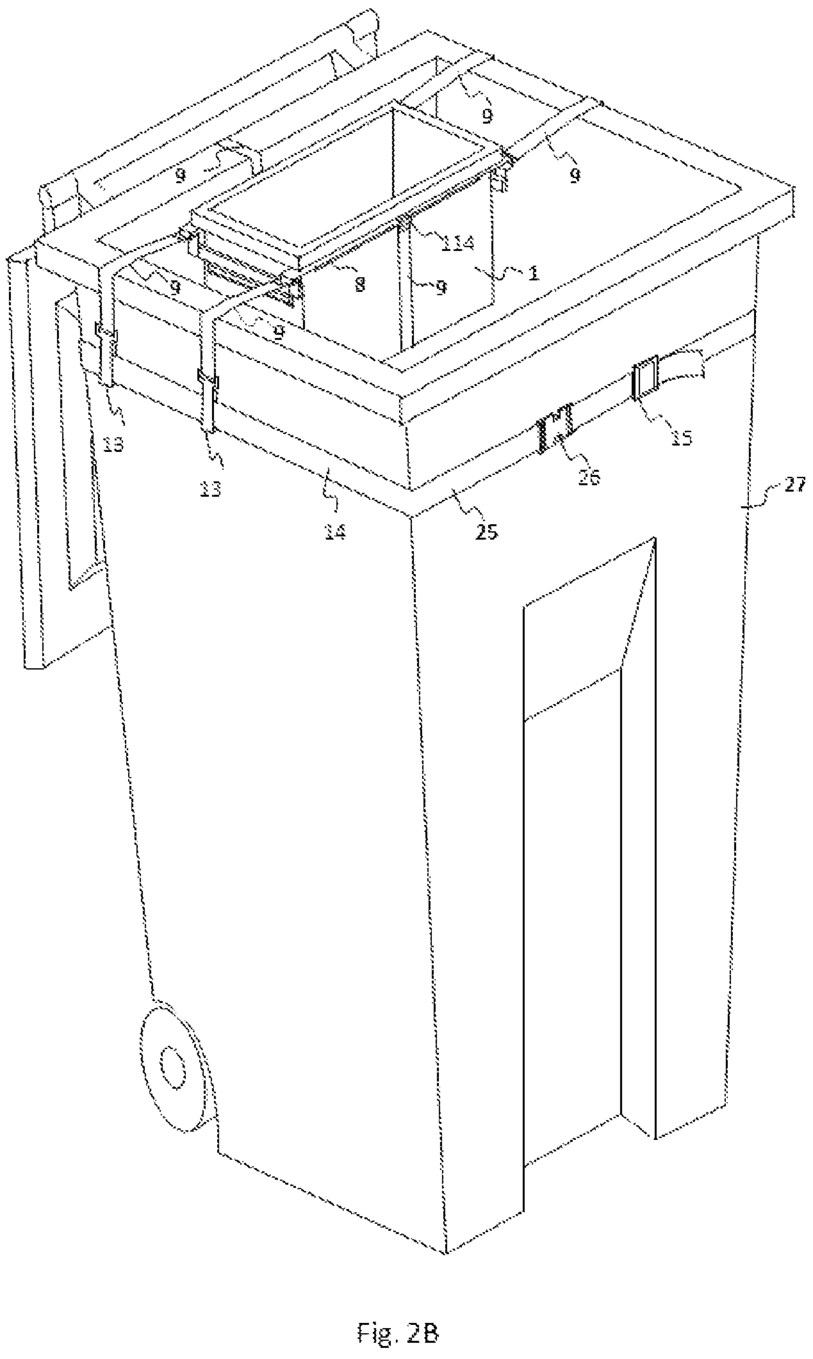
FIG. 2B A schematic diagram of a trash receptacle and a garbage cart with another option of fixture strap mounting scheme.

In the first embodiment, a trash receptacle 1 and a matching fixture 7 are schematically shown in FIG. 1A. The trash receptacle 1 is a plastic or a metal container which has a top beam/rim 2 around its upper opening and two stoppers 3 on the outside of container wall 4. Beam 2 must be strong enough to hang and support the weight of receptacle 1 with garbage loaded. Stopper 3 must be also strong enough to secure receptacle 1 when it is upside down and shaken. To serve support and secure purposes, Beam 2 and stopper 3 can have various structures and shapes. For example, beam 2 can be a solid beam or a turnover rim. A typical trash receptacle 1 has a rectangular volume with defined width, length and depth as shown in FIG. 1A. In other options, a container can have a trapezoid volume. The fixture 7 comprises one trash receptacle holder 8 and at least four adjustable and flexible strap assemblies 9. The holder 8 comprises two weight support bars 11 and two secure bars 12. The support bar 11 is designed to contact the underneath of beam/rim 2 and to support the weight of trash receptacle 1. The two secure bars 12 connect two support bars 11 via rectangular holes 113 on support bar 11 as shown in FIG. 1A and FIG. 1B. The distance between two support bars 11 is fixed by the length of secure bar 12 and is equal to or a slightly larger than the width of trash receptacle 1 so that beam 2 can sit on two bars 11. The distance between two secure bars 12 is equal to or a slightly larger than the outside length of trash receptacle 1, and is less than the distance between the two top surfaces of stopper 3. Bar 11 and 12 can be made from metal or plastics. One preferred option is sheet metal for bar 11 and plastics for bar 12. With a proper selection of sheet metal, thickness and sizes, a strap buckle receiving portion 111 and vertical portion 112 of bar 11 can provide elastic deformation needed by secure bar 12. When trash receptacle 1 is put into holder 8 as shown in FIG. 2A, two stoppers 3 push secure bars 12 open and slide down and then are finally positioned right below secure bars 12 when beam 2 touches support bars 11. Without a pull force bigger than a certain value, stoppers 3 and secure bars 12 prevent trash receptacle 1 from pulling out or dropping off when the garbage cart is upside down and shaken. The adjustable strap assembly 9 comprises a strap hook 13, a webbing strap 14, a strap adjuster and tension lock (adjuster-and-lock) 15 and a strap loop holder buckle 16. Adjuster-and-lock 15 can be one crossbar tension lock or a two crossbar (ladder) tension lock. For explicit purpose, the holder 8 and strap assemblies 9 of the fixture 7 in FIG. 1A are not assembled. Webbing strap 14 can be made from plastics such as nylon. Strap hook 13 and strap adjuster-and-lock 15 can be made from metal or plastics such as nylon. In operation, the loop holder buckle 16 is to grip support bar 11 at receiving portion 111 as shown in FIG. 1B. The loop holder buckle 16 is assembled with support bar 11 before assembling secure bar 12. The length of straps 14 can be adjusted with adjuster-and-locks 15 to fit various sizes of garbage carts. Four straps 9 are needed to attach holder 8 firmly to the two opposite sides of garbage cart 20 as shown in FIG. 2A. Strap 9 is simply presented without drawing adjuster-and-locks 15 in FIG. 2A and 2B. If trash receptacle 1 is not mounted near the front wall of cart 20, an additional strap 9 can be used to support the bottom of the trash receptacle 1 via a strap buckle hook 114 as shown in FIG. 2B. A typical garbage cart 20 has a turnover rim 21 which can be used for attaching hook 13. For a garbage cart 27 without the turnover rim as shown in FIG. 2B, an adjustable strap loop 25 around the aperture of the garbage cart can be used. Usually the upper portion of a garbage cart has a bigger opening perimeter than that of lower portion of the cart, especially for a garbage cart with a top rim or beam around the opening. This allows a fasten strap loop 25 with fixture 7 to be attached to the garbage cart securely. Strap loop 25 may comprise a webbing strap 14, a strap adjuster-and-lock 15 and one side-release buckle 26. In another option, a strap loop can use a hook-and-loop to replace the adjuster-and-lock 15 and side-release buckle 26.

When garbage cart 20 rotates under an operation of a garbage truck, twist force and stress applied to support bars 11 by trash receptacle 1 increase. This means the contact wall area of trash receptacle 1 under beam 2 is also subject to the twist forces and stress. Because of this reason, there is a requirement to strengthen the wall of trash receptacle 1 near the contact area with support bar 11. Usually, trash receptacle 1 and fixture 7 are arranged near the top front of garbage cart as shown in FIG. 2A. When garbage cart 20 rotates, trash receptacle 1 and trash receptacle holder 8 will tilt at an initial stage of the rotation and one side wall near the bottom of trash receptacle 1 could touch the front inner wall of garbage cart 20. This could set a limit for the force applied to the wall of trash receptacle 1 by support bar 11. In case trash receptacle 1 and fixture 7 are mounted in the middle or close to the rear wall of cart 27 as shown in FIG. 2B. A strap assembly 9 grips buckle hook 114 of front support bar 11 and goes underneath the trash receptacle 1 and then attaches to strap loop 25 or the back rim of garbage cart could significantly reduce the twist force and stress applied to the wall of trash receptacle 1 by support bars 11.

Figure 3A:
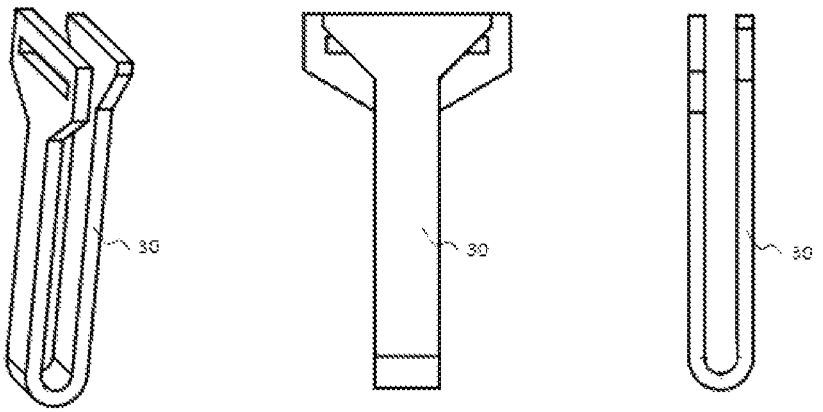
FIG. 3A A schematic diagram of a strap hook for garbage carts.
Figure 3B:
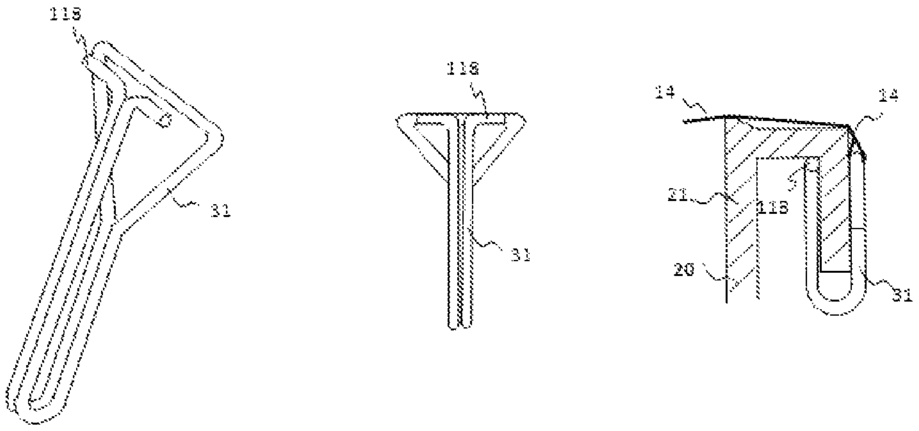
FIG. 3B A schematic diagram showing a wire strap hook and how it works with a garbage cart which has a turnover rim.

When garbage cart 20 rotates under an operation of a garbage truck, besides a pull force, strap 14 will apply a transverse force to hook 13. A typical strap hook 13 contacts the end of the rim of the cart 20 at hook's U-turn (or elbow) portion. The end of rim 21 is vulnerable to a big force which could damage the rim. The transverse force will cause the hook tilt with a torque. This will cause strap 14 and hooks 13 sliding along the rim 21 of garbage cart 20 easily. To eliminate the torque, innovative strap hooks 30 and 31 are designed with long arms as shown in FIG. 3A and 3B. The new hooks comprise four portions: 1) arm and strap receiving portion; 2) U-turn portion; 3) forearm and 4) flat end of forearm. The long arms and forearms avoid contacting the end of rim 21 with hook's U-turn portion. The innovative hook is designed to contact the horizontal portion of rim 21 with its flat end 118 of the forearm as shown in FIG. 3B. So the forearm with its end should be longer than the depth of turnover rim 21 and also longer than the length of hook arm minus the wall thickness of rim 21. This will cause the major force the strap exerting to the hook is toward up direction. Then the major force applied by the end of the forearm to the horizontal portion of rim 21 is also toward upside. This can make the innovative hooks not easy to slide down when the cart 20 rotates. To increase friction, the gap between the end portion of forearm and the strap arm can be constructed to be smaller than the thickness of the rim so that the hook can clamp on the rim with an elastic force. This gap can be less than 4 mm. Furthermore, the forearm can be coated with high friction material such as synthetic rubber for hook 30 or covered with high friction material sleeves such as rubber or synthetic rubber sleeves for hook 31. The new hooks can be constructed with plastic and sheet metal for hook 30 or with metal wire for hook 31. The enlarged and flat ends of the hooks are designed to protect rim 21 with less stress on the rim and more friction with more contact area.

Figure 4A:
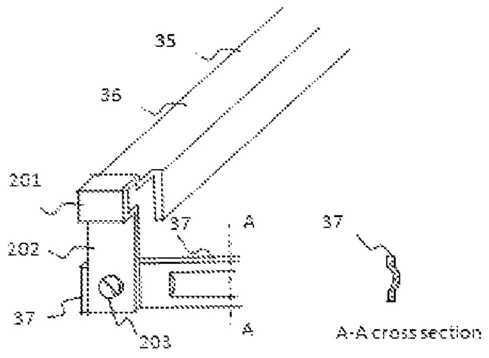
FIG. 4A A schematic diagram of a trash receptacle holder.
Figure 4B:
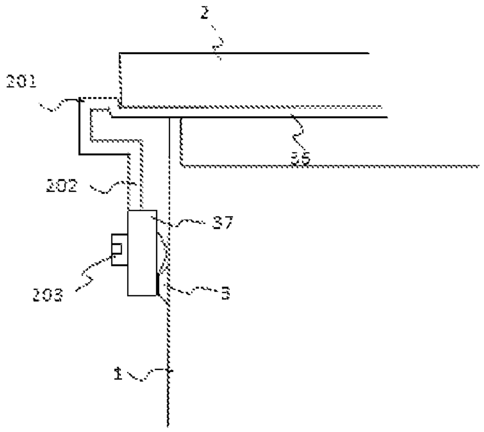
FIG. 4B A schematic diagram showing a fitting-in position of a trash receptacle with a trash receptacle holder.

In the second embodiment, trash receptacle holder 35 has another option. Support bar 36 and secure bar 37 have different design as shown in FIG. 4A and FIG. 4B. The support bar 36 has a raised strap loop buckle receiving portion 201 which can prevent trash receptacle 1 from moving along the direction of bar 36 and reduce a force applied to secure bar 37 by trash receptacle 1 when garbage cart 20 tilts along the direction of weigh bar 36. The secure bar 37 can be made from sheet metal. Bars 36 and 37 are connected and fixed by screws 203. The cross section of the secure bar 37 can have an arch feature that allowing it to move smoothly against stopper 3 when trash receptacle 1 is inserted in trash receptacle holder 35. FIG. 4B shows their relative positions among beam 2, stopper 3, support bar 36 and secure bar 37 when trash receptacle 1 is fitted in trash receptacle holder 35.

Figure 5A:
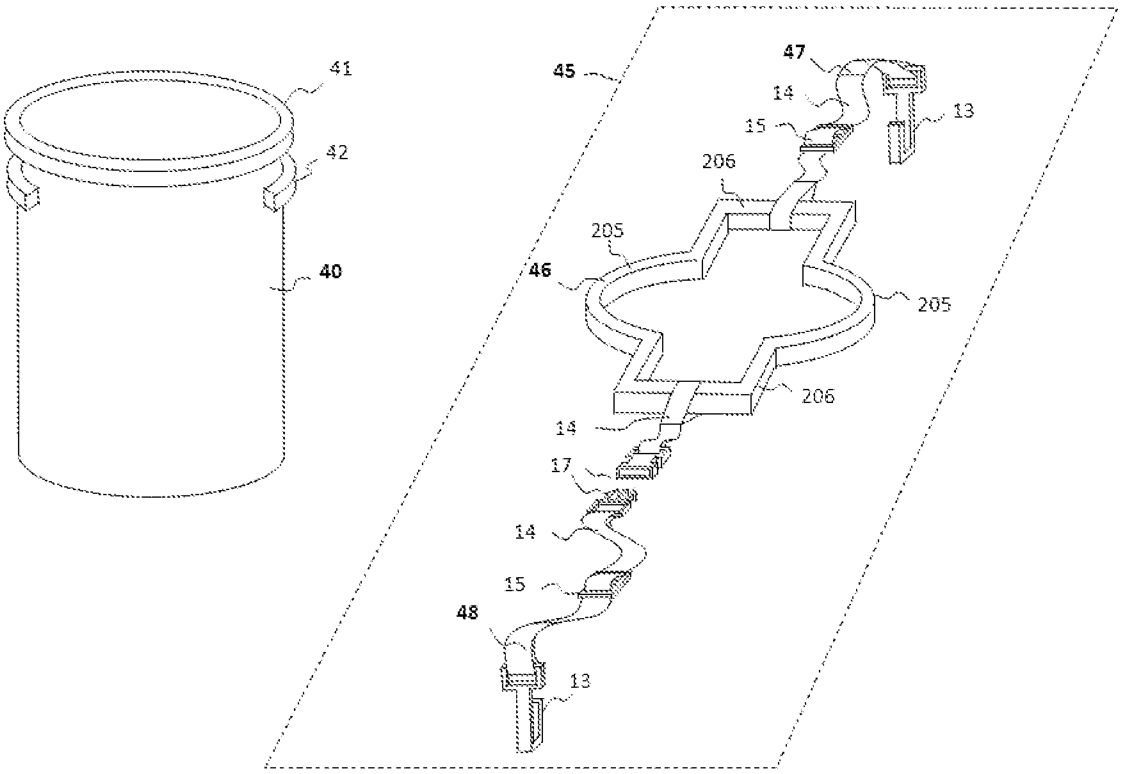
FIG. 5A A schematic diagram of a cylindrical trash receptacle and its matching fixture.
Figure 5B:
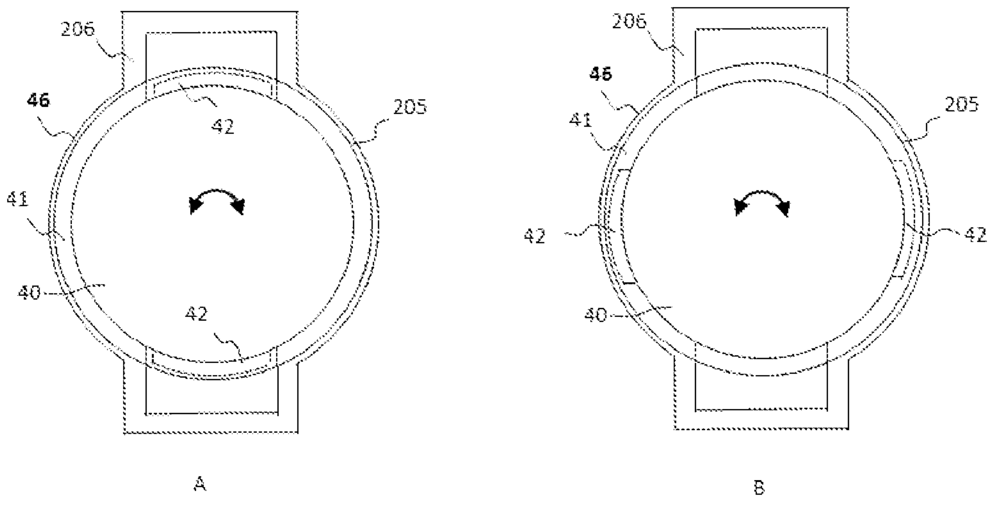
FIG. 5B A schematic diagram of two positions which a cylindrical trash receptacle is unsecured with its holder and the cylindrical trash receptacle is secured with its holder.

In the third embodiment, trash receptacle 40 has a cylindrical volume as shown in FIG. 5A. Like the first embodiment, trash receptacle 40 comprises three key features: 1) a container that can hold garbage, 2) a weight support structure which can hang and support a full weight of the trash receptacle with garbage loaded and 3) a secure structure (stopper) which can prevent the trash receptacle from dropping off. In this embodiment, receptacle beam/rim 41 is also circular. Two stoppers 42 are only small portions of circular bar. Fixture 45 comprises a trash receptacle holder 46 and at least two strap assemblies 47 and 48. Strap assembly 47 comprises a strap hook 13, an adjuster-and-lock 15 and a webbing strap 14 which can connect holder 46 directly. Strap assembly 48 comprises a strap hook 13, straps 14, an adjuster-and-lock 15 and a side-release buckle 17. This strap assembly 48 can allow fixture 45 to be removed from a garbage cart quickly and easily. The side-release buckle 17 can be replaced with other fasteners such as a hook-and-loop. Trash receptacle holder 46 has a beam/bar structure that can support the weight of the trash receptacle 40 and also secure the trash receptacle 40. The holder 46 comprises two circular portion 205 and two rectangular portion 206 with an inner diameter equal or slightly larger than the outside diameter of the trash receptacle 40 so that the trash receptacle 40 can be inserted in holder 46. In another option, rectangular portion 206 can be changed to a trapezoid shape which can reduce shear stress on the bars. To secure trash receptacle 40 in the holder 46, there are two steps of putting trash receptacle 40 into holder 46. The first step is to adjust the trash receptacle 40 with stoppers 42 aligned within the rectangular bars 206 as shown in position A of FIG. 5B (top view) and then to lower trash receptacle 40 until stopper 42 is below the bar of holder 46. The second step is to rotate the trash receptacle 40 by 90 degree and stopper 42 is underneath the circular bars 205, and then continue to lower trash receptacle 40 until beam 41 sits on the bar of holder 46. With a position B as shown in FIG. 5B, trash receptacle 40 is secured even when a garbage truck rotates a garbage cart that trash receptacle 40 is attached. To remove trash receptacle 40 out of holder 46, procedure is just reverse of the above two steps.

Figure 6A:
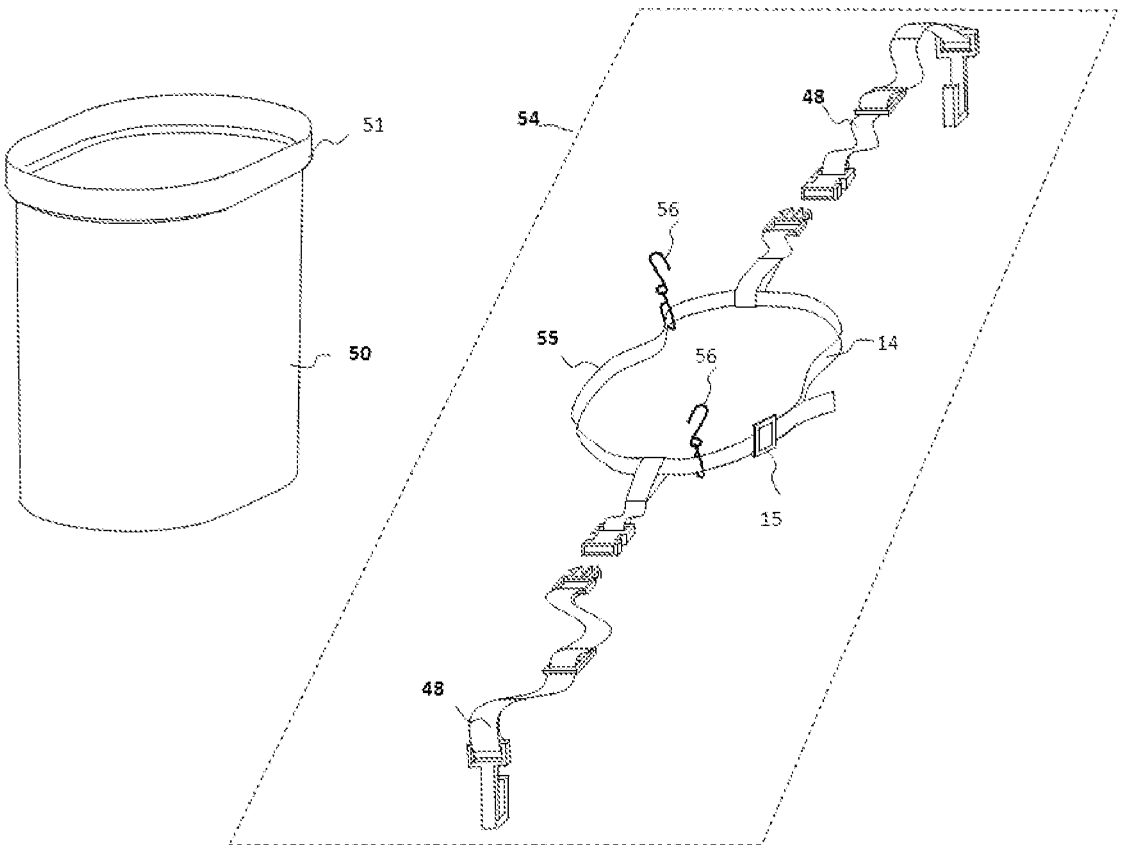
FIG. 6A A schematic diagram of an oval trash receptacle without a stopper and its flexible and adjustable fixture.
Figure 6B:
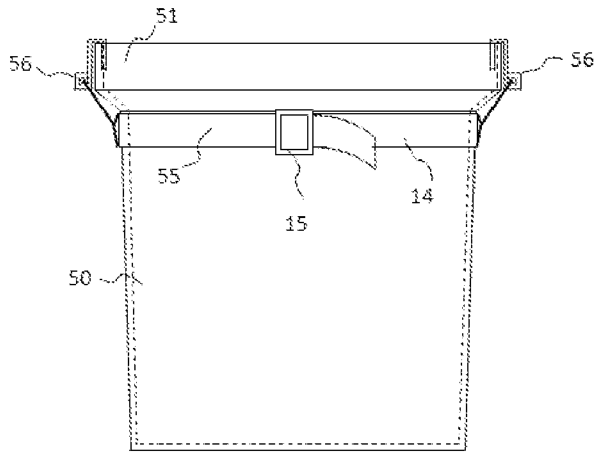
FIG. 6B A schematic diagram of a trash receptacle that is mounted and secured in its flexible and adjustable holder.

In above embodiments, the fixtures have to have the trash receptacle holders to match the trash receptacles in term of sizes and shapes so that the holders can grip and support the trash receptacles. In the 4th embodiment, a trash receptacle holder 55 of fixture 54 is a flexible and adjustable strap loop as shown in FIG. 6A. This holder 55 may simply comprise a webbing strap 14, an adjuster-and-lock 15 and at least two secure devices 56. Secure device 56 may comprise a hook and an elastic cord that attaching to strap 14 of holder 55. The elastic cord should have a limited expansion length. Fixture 54 comprises at least two strap assemblies 48 and a holder 55. In another option, strap assembly 48 can be replaced by strap assembly 47 in fixture 54. This fixture 54 can be functional for some trash receptacles in market even without constructing a secure stopper on the trash receptacles. FIG. 6A and 6B shows an example of an oval bucket 50 which can work with fixture 54. An expanded top rim 51 with a parallel shoulder allows holder 55 to support the bucket 50. Secure devices 56 can prevent to bucket 50 to drop off when the fixture and bucket are upside down.

Figure 7A:
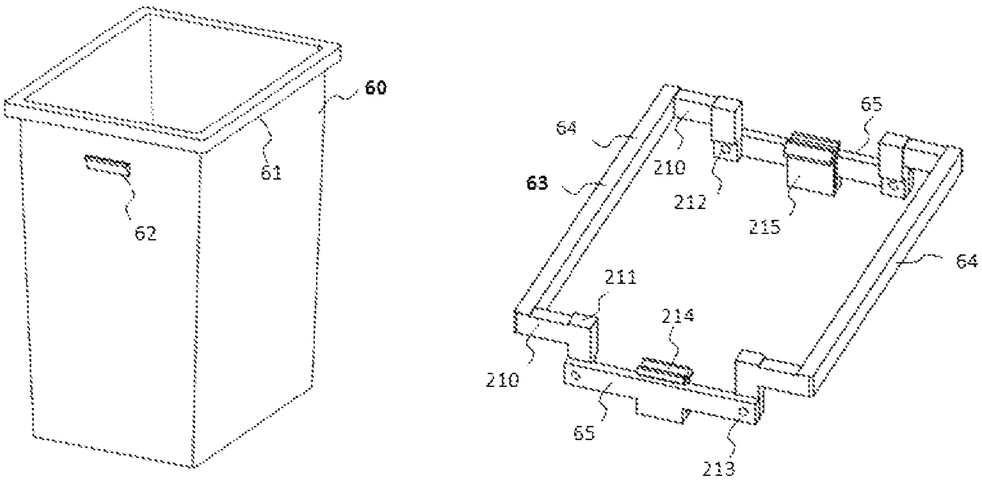
FIG. 7A A schematic diagram of a trash receptacle with stoppers and its matching holder.
Figure 7B:
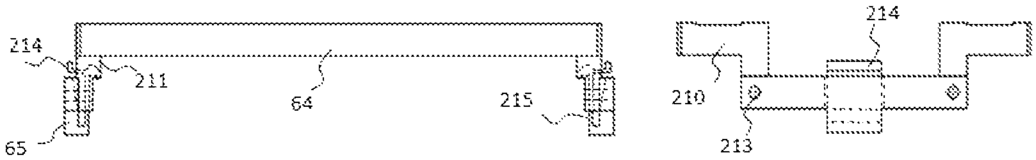
FIG. 7B A schematic diagram of a trash receptacle holder.
Figure 7C:
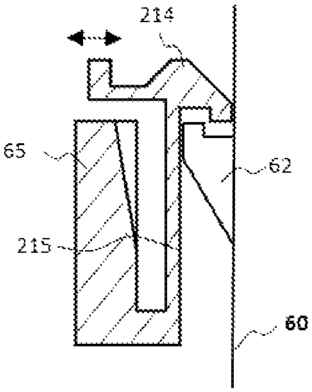
FIG. 7C A schematic diagram of a stopper of a trash receptacle and a secure latch of a holder in a normal position.
Figure 7D:
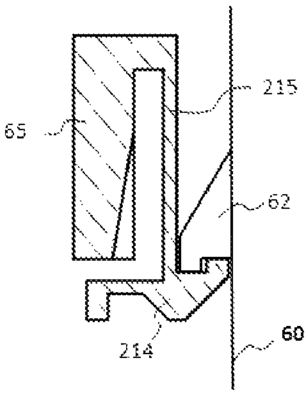
FIG. 7D A schematic diagram of a stopper of a trash receptacle and a secure latch of a holder in an upside down position.
Figure 7E:
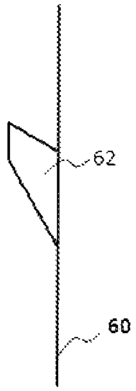
FIG. 7E A schematic diagram of another option of stoppers of a trash receptacle.

In the first and second embodiments, the stopper 3 of trash receptacle 1 has a trapezoid shape which allows receptacle 1 to be pulled out with a force. However the force can be a variable due to the geometry and elasticity change of trash receptacle 1 and holders 8 and 35 including secure bars and weight support bars. To reduce the chance of losing a trash receptacle to a garbage truck, the fixture and trash receptacle should have a secure lock mechanism which only allows the trash receptacle to be removed from the fixture after its user unlocks it intentionally. In the fifth embodiment, two stoppers 62 of receptacle 60 have a hook/groove profile as shown in FIG. 7A and 7C. Receptacle 60 has a trapezoid volume. A fixture for receptacle 60 comprises at least four strap assemblies 47 and a trash receptacle holder 63. Holder 63 includes two weight support bars 64 and two secure bars 65 as shown in FIG. 7A. Both bars can be made from materials such as molded plastics or 3D printing plastics. Support bar 64 has strap receiving portions 210 to connect strap assemblies 47. Webbing straps 14 grab support bars 64 directly at strap receiving portions 210. Support bars 64 and secure bars 65 are connected using screws via holes 212 and 213. The inner size of holder 63 is designed to just fit trash receptacle 60. When trash receptacle 60 is inserted in holder 63, vertical bar feature 211 creates a space between beam 61 and secure bar 65 so that hands can grab underneath of beam 61 to lift trash receptacle 60. The details of secure bar 65 are shown in FIG. 7B and 7C. A secure bar 65 includes a spring latch with a secure head 214 and a flexible and elastic sheet 215. Secure head 214 and stopper 62 have matching hook/groove profile so that they can be locked when holder 61 and trash receptacle 60 are in upside down position as shown in FIG. 7D. Because head 214 and elastic sheet 215 will experience a big force/stress from stopper 62 of trash receptacle 60, it is easy to be pushed open if there is no the hook/groove profile. The hook/groove profile can have different hook profiles to achieve the same goal. FIG. 7E shows another example of hook profiles which is like a shark fin. When holder 63 and trash receptacle 60 are in a normal position as shown in FIG. 7C, secure head 214 and stopper 62 are not in a lock position, and hands can flex elastic sheet 215 and move secure head 214 horizontally away from stopper 62 so that trash receptacle 60 can be lifted and removed.

Figure 8A:
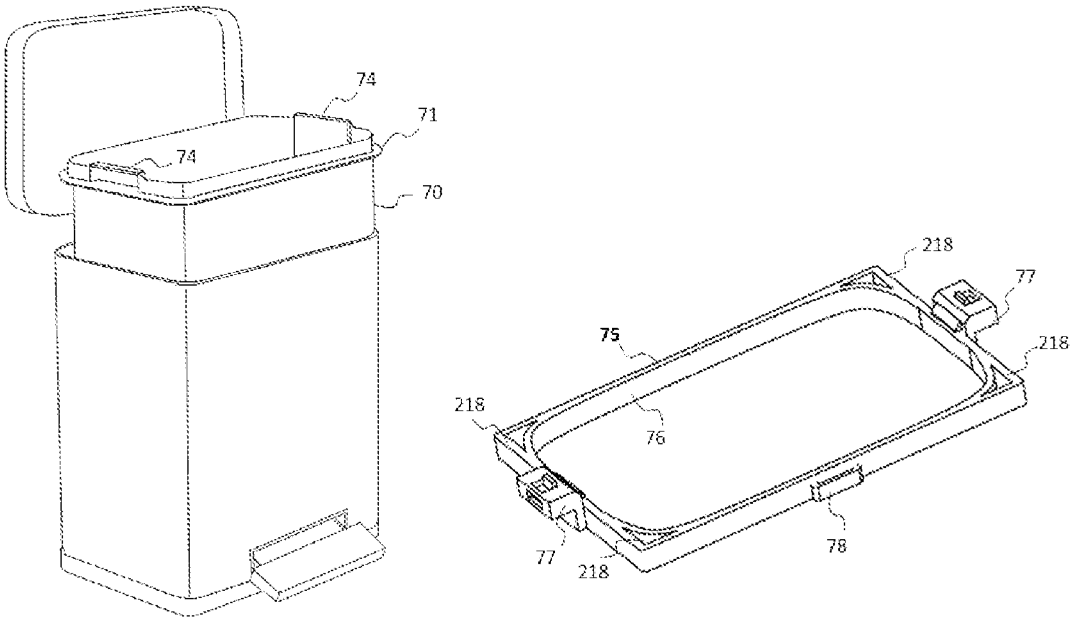
FIG. 8A A schematic diagram of a step trash receptacle and its matching holder.
Figure 8B:
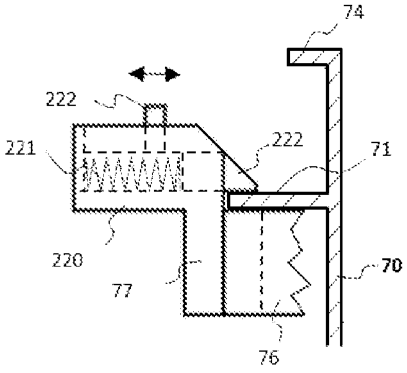
FIG. 8B A schematic diagram of a part of a trash receptacle and a slide latch in a secure position.
Figure 8C:
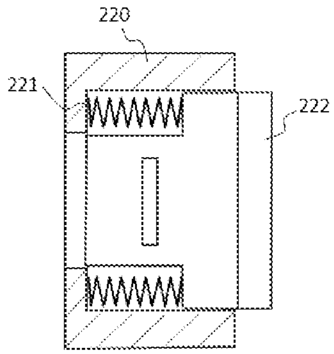
FIG. 8C A schematic diagram of a top view of a slide latch without the top of latch case.
Figure 8D:
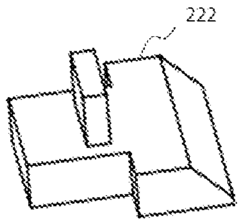
FIG. 8D A schematic diagram of a latch bolt of a slide latch.

In the above embodiments except the fourth embodiment, trash receptacles don't have a specific handle for lifting. The top beams/rims of the trash receptacles serve as handles for lifting. Their secure stoppers are constructed under the beams/rims. Without such stoppers, trash receptacles are easy to be stacked up. To simplify the construction of trash receptacles and trash receptacle holders and get rid of the stoppers under the top beam/rims of trash receptacles, specific handles can be constructed on or above the beam/rims. In the sixth embodiment, a trash receptacle/liner 70 has two handles 74 constructed with an elevated ridge above a protruding rim 71 as shown in FIG. 8A. There is no a specific stopper constructed for trash receptacle 70. Because rim 71 can also serve as a stopper because of its strength and perpendicular design with respect to lifting direction. So rim 71 is both a support rim and a stopper of receptacle 70. This kind of design can be found from inner buckets/liners of step trash bins. Excluding two slide latch lock 77, bucket/liner holder 75 of fixture has a loop bar 76 matched to rim 71 to grip and support receptacle 70. This loop bar 76 doesn't have separated support and secure bars. Slide latch lock 77 can be a separated device which is attached to loop bar 76 by screws, buckles or even glues. In another option, a part of slide latch lock 77 can be constructed with loop bar 76 together as one piece of molded plastics. Holder 75 has four strap receiving portions 218 for strap assemblies 47. Holder 75 may have optional one or more than one strap receiving structure 78. Holder 75 can have a plurality of secure devices 77 attached to its loop bar. For a preferred example, but no limiting embodiment, secure device 77 is a slide latch lock 77 which comprises a latch case 220, compression springs 221 and a slide latch bolt 222 as shown in FIG. 8B, 8C and 8D. When receptacle 70 is put on holder 75, it will be automatically locked by slide latch 77 as shown in FIG. 8B.

Figure 9:
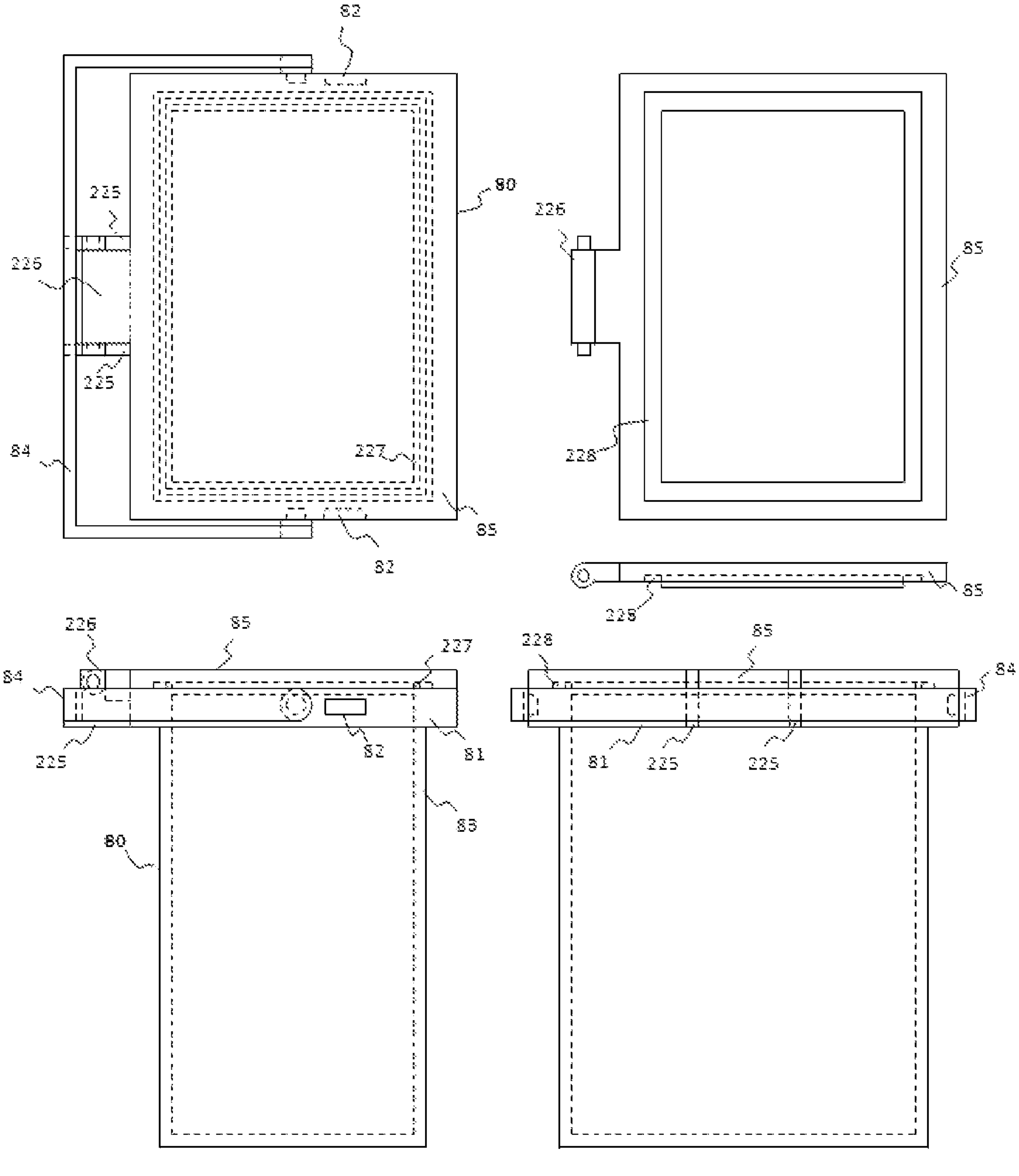
FIG. 9A schematic diagram of a trash receptacle which has a lid and a handle. Its stoppers are two holes on its top beam/rim.

Apart from the features needed for a trash receptacle to be mounted securely in a garbage cart, other features such as an airtight or tightly-closed lid and a one hand handle are also preferred. FIG. 9 shows a trash receptacle 80 with a rotatable handle 84 and a lid 85. Trash receptacle 80 also comprises support beam/rim 81, stoppers 82 and container wall 83. The stopper 82 is a hole caved on beam/rim 81 in order to catch a slide latch bolt. Receptacles 80 work with holders similar to holder 75 with slide latches. Trash receptacle 80 has hinge support structures 225 that firmly connect to beam 81. Lid 85 has hinge 226 to match hinge 225. Trash receptacle 80 has an elevated ridge 227 on the flat top of rim. Lid 85 has a rubber ring 228 which can work with ridge 227 to seal trash receptacle 80. When lid 85 is closed, the weight of lid 85 presses the rubber ring 228 against ridge 227. This tightly-closed lid can greatly improve lid seal issue of current garbage carts.

Figure 10A:
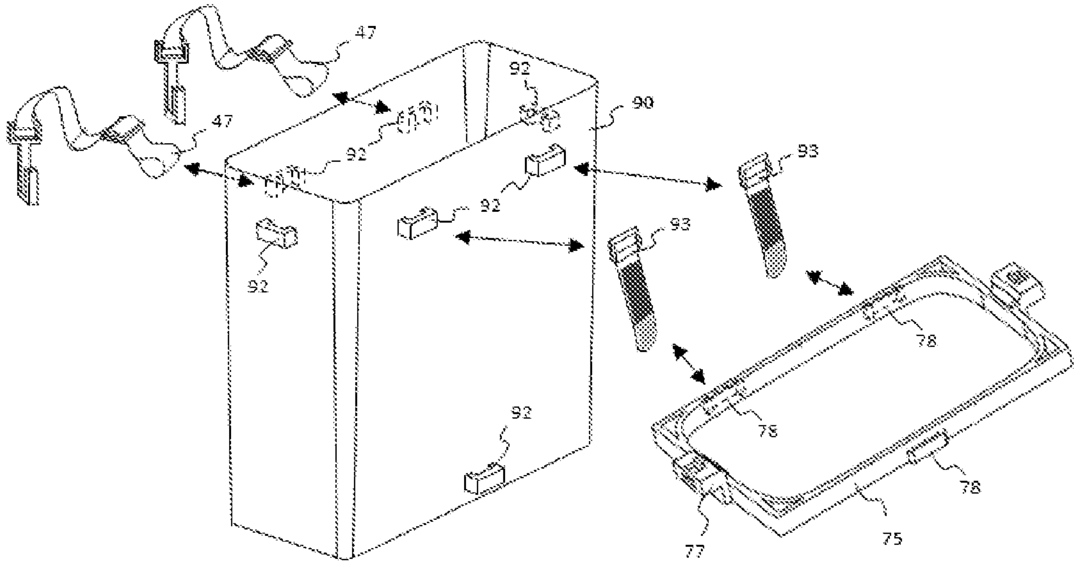
FIG. 10A A schematic diagram of an additional trash receptacle, straps and a holder.
Figure 10B:
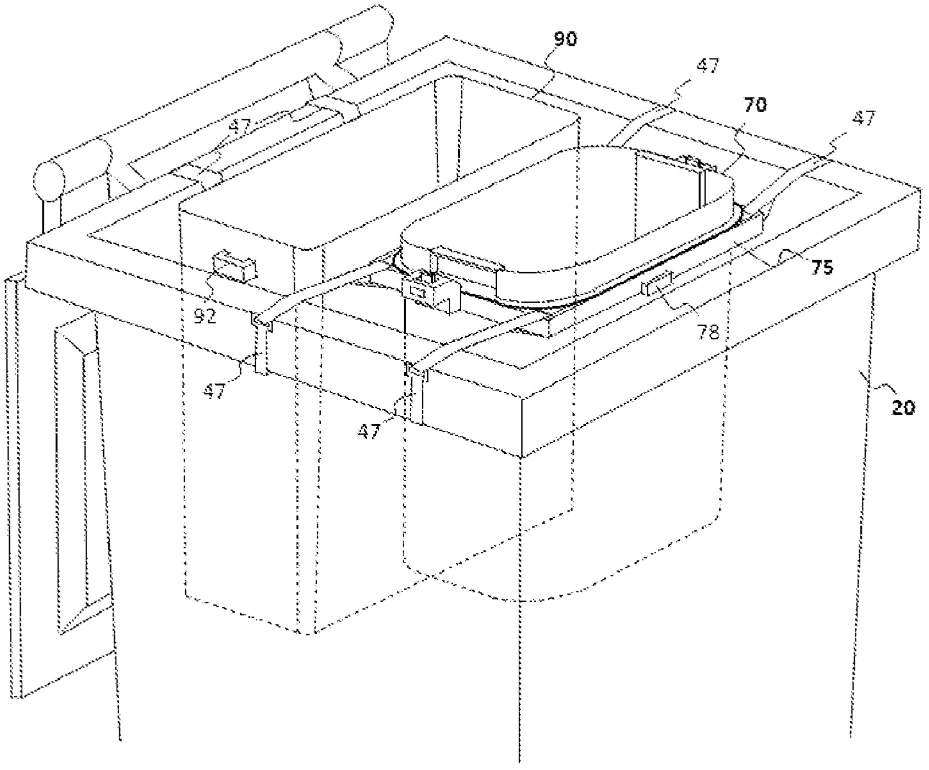
FIG. 10B A schematic diagram of two small trash receptacles in a big garbage cart.
Figure 10C:
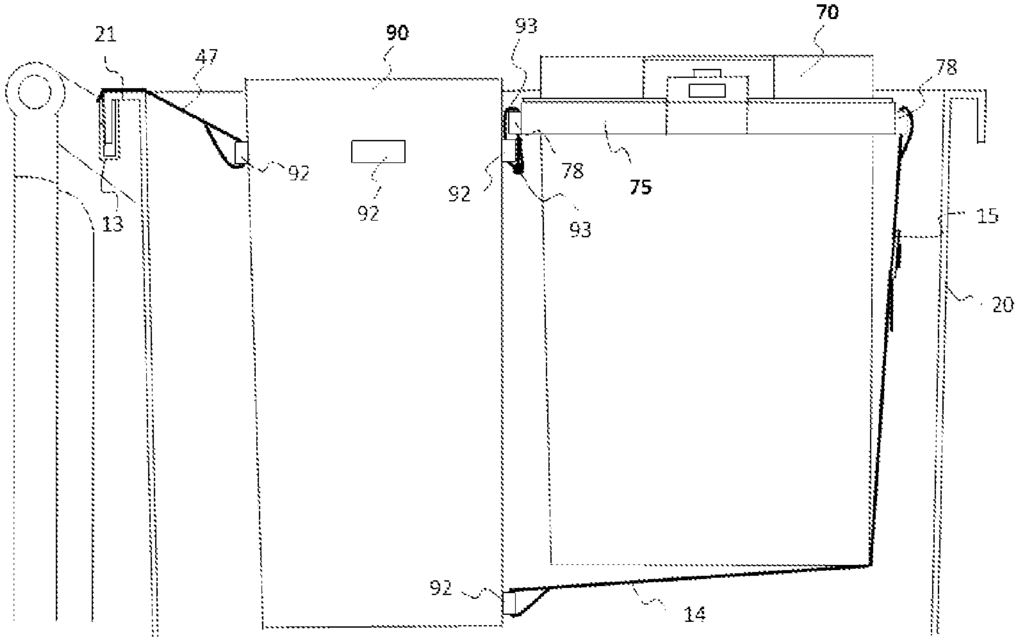
FIG. 10C A schematic diagram of a connection option of two trash receptacles and a garbage cart.

Households need big organic garbage carts to dump yard trims or a big volume of food scraps, food plates and boxes occasionally. However most of the times, a small or median volume capacity should be enough. Therefore more than one removable trash receptacles can increase volume capacity and keep the advantage of easy clean and odor control. Because fixture hardware can also be removed, households have more choice to deal with compostable garbage. In above embodiments, the small trash receptacles mounted in the garbage carts are mainly for food scraps. In case there are more non-food wastes such as big pizza boxes, paper plates or small amount of yard trimmings and the small removable trash receptacle can't handle, an additional trash receptacle can be added to the fixture other than using the full capacity of the garbage cart. So one trash receptacle can be used for wet food scraps and another one for dry soiled paper boxes, plates and a small amount of yard trimmings. In the seventh embodiment, a rigid or semi-rigid trash receptacle 90 can be attached to the fixture and the garbage cart as shown in FIG. 10A, 10B and 10C. Trash receptacle 90 has several strap receiving structures 92 on the outside of its wall. Some 92 can be used to connect to strap receiving structures 78 of holder 75 with hook-and-loop straps 93. Other strap receiving structure 92 can be used to attach to garbage cart 20 with strap assemblies 47. FIG. 10B and 10C show how two trash receptacles 70 and 90 are arranged in cart 20. In another option, trash receptacle 90 can be a non-rigid basket or a plastic bag. In this case, a strap constructed with a webbing strap 14 and a strap adjuster-and-lock 15 can grab strap receiving structure 92 at the bottom of receptacle 90 as shown in FIG. 10C.

Figure 11A:
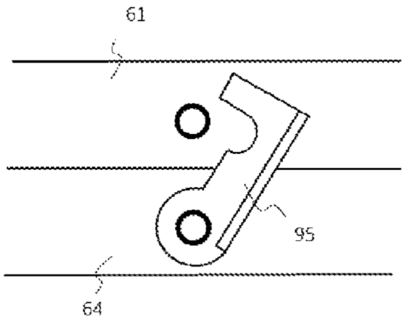
FIG. 11A A schematic diagram of a secure latch for a trash receptacle and its holder.
Figure 11B:
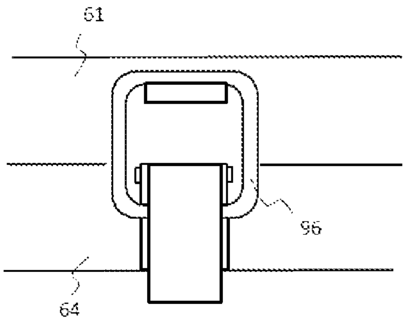
FIG. 11B A schematic diagram of a secure latch for a trash receptacle and its holder.

There are some other options for secure latches. FIG. 11A and 11B show two options of secure latches for trash receptacle 60 and holder 63 as examples. Such latches can also be used as additional security locks. Latch 95 and latch 96 are similar to widely used door and draw latches.

Figure 12A:
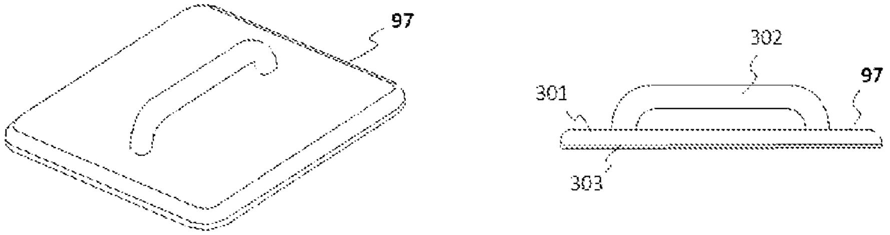
FIG. 12A A schematic diagram of an adhesive strap holder buckle which can be attached to inner wall of a garbage cart.
Figure 12B:
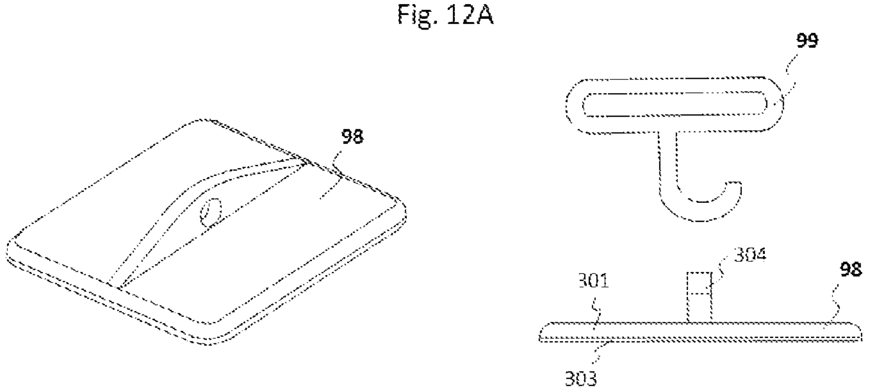
FIG. 12B A schematic diagram of a strap hook and an adhesive hook receiving buckle which can be attached to inner wall of a garbage cart.
Figure 12C:
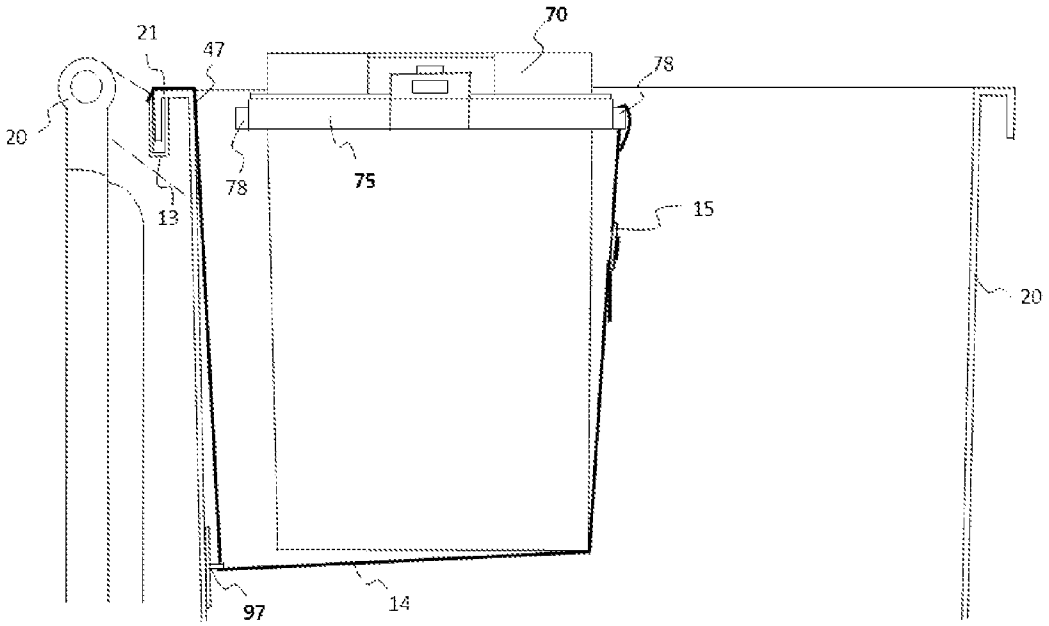
FIG. 12C A schematic diagram of a trash receptacle mounted in rear position of a garbage cart with an adhesive strap holder buckle attached to the rear and inner wall of the garbage cart.
Figure 12D:
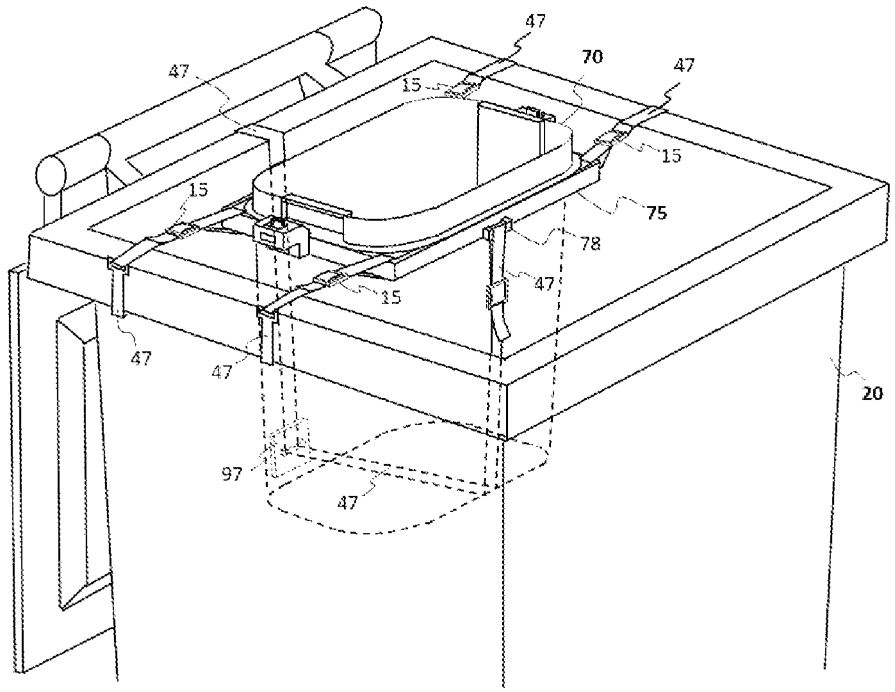
FIG. 12D A prospective view of a trash receptacle mounted in rear position of a garbage cart with an adhesive strap holder buckle attached to the rear and inner wall of the garbage cart.
Figure 13A:
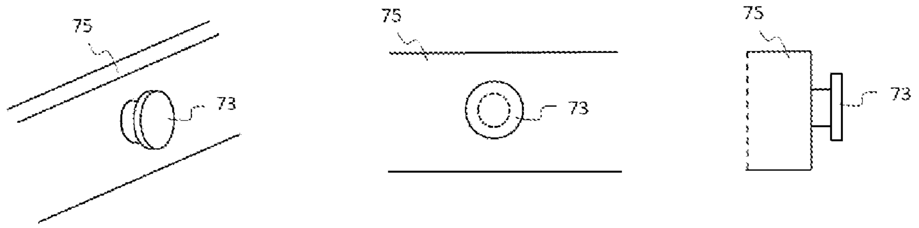
FIG. 13A A schematic diagram of a disk button attached to the outside of a trash receptacle holder.
Figure 13B:
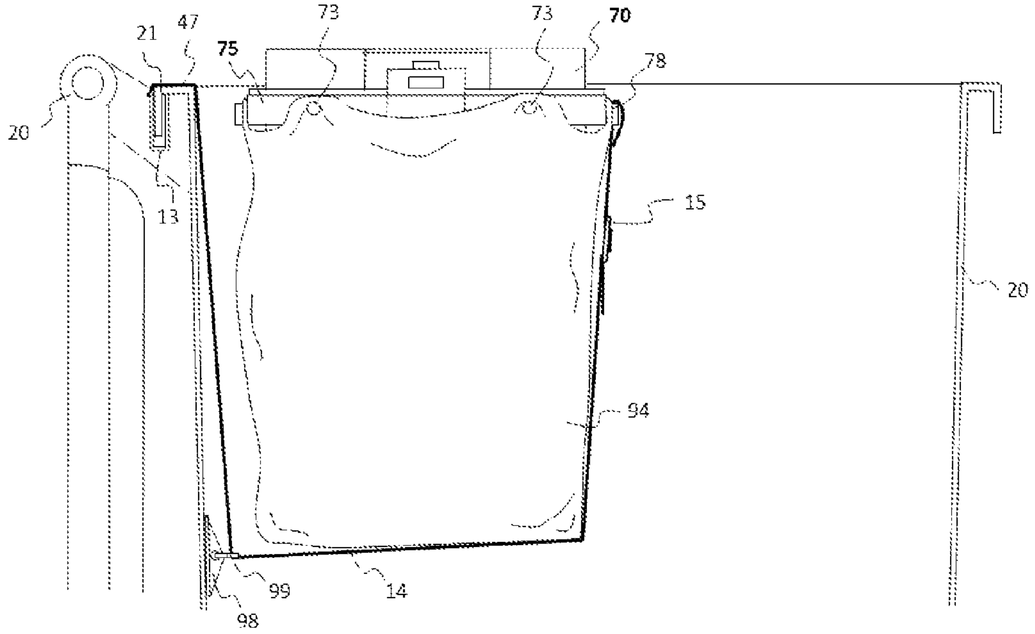
FIG. 13B A schematic diagram of a plastic bag fastened with buttons on a receptacle holder.

In the first embodiment, when a trash receptacle is not mounted near the front wall of cart 20, an additional strap assembly 9 can be used to support the bottom of the trash receptacle 1 via a strap buckle hook 114 as shown in FIG. 2B. But the bottom of the trash receptacle could tilt to the front wall with an angle larger than 30 degree when the garbage cart rotates because the strap is flexible and not tighten. If a user wants to load some yard trimmings in the garbage cart, the tilted trash receptacle could prevent the trimmings below the bottom of the trash receptacle to drop off. To minimize the tilt, in the eighth embodiment, an adhesive strap holder 97 or an adhesive hook receiving buckle 98 with a strap hook 99 can be used as shown in FIG. 12A, 12B, 12C and 12D. An adhesive strap holder 97 comprises a flat base 301, a strap holder 302 and a strip of adhesive material 303 which can be a high duty glue pad or removable adhesive gel. The base 301 and strap holder 302 can be made from metal or plastics. In FIG. 12C, strap assembly 47 connects the front strap holder 78 of trash receptacle holder 75 to the rear top rim of the garbage cart 20. The purpose of this strap assembly 47 is to minimize the tilt and reduce the twist force on holder 75. So strap holder 97 should be mounted at a height close to or below the bottom of trash receptacle 70. The strap 14 will bear a large portion of weight force of the trash receptacle when garbage cart 20 rotates about 90 degree. So adhesive strap holder 97 should be constructed to hold up to a big weight force such as 20 lb for a 3 gal trash receptacle. An adhesive strap holder 97 is not a convenient design if the strap assembly 47 needs to be mounted then removed quite frequently. An adhesive hook receiving buckle 98 and a strap hook 99 can make the mounting and removal much easy. Strap 14 goes through the slot of strap hook 99. Adhesive hook receiving buckle 98 is attached to the rear wall of garbage cart 20. Buckle 98 has a low profile design with a slope ridge 304 along a vertical direction in cart 20 so as to minimize garbage residuals and influence on flow of garbage when cart 20 returns to its full capacity usage. With the eighth embodiment, a user can load a small amount of additional organic waste in the garbage cart. To minimize garbage residuals because of the blockage of the trash receptacle and its fixture, the additional waste should have narrow or small sizes which can easily flow in space between the front wall of the trash receptacle and the front wall of the garbage cart. In a garbage cart dumping process, the additional organic waste with dust can make the outside of the trash receptacle dirty. To address this issue, a plastic bag that can cover the outside of the receptacle can be attached to the receptacle holder. To attach a plastic bag to the receptacle holder easily, multiple buttons/hooks can be constructed or attached to the receptacle holder. The plastic bag can remain its attachment to the receptacle holder and allow the trash receptacle to be put in or moved out from the bag. In an embodiment, a button 73 with a shape similar to a disk or mushroom is attached to the outside of receptacle holder 75 as shown in FIG. 13A. A plastic bag 94 that covering the outside of receptacle 70 is hanged with a plurality of buttons 73 on holder 75 as shown in FIG. 13B. The plastic bag 94 has a plurality of buttonholes on its top portion to match buttons 73 so that it can be attached to holder 75.

Figure 14:
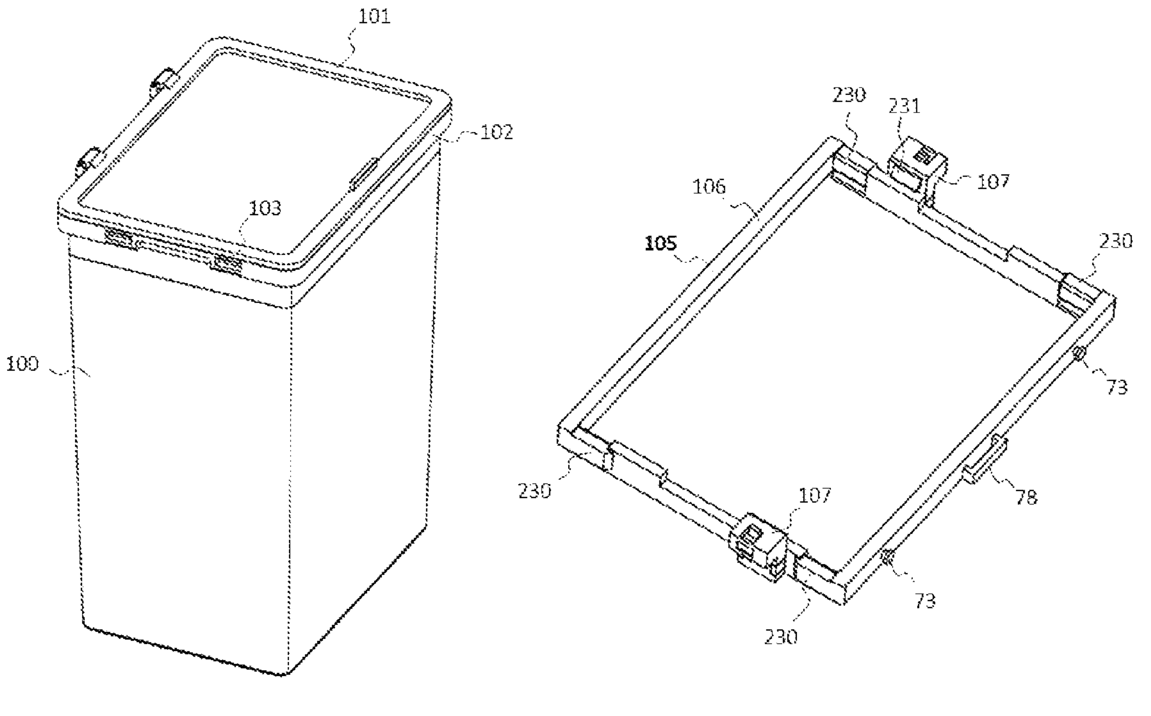
FIG. 14A schematic diagram of a trash receptacle with a lid and its matching holder.

In the ninth embodiment, a trash receptacle 100 with a lid 101 is shown in FIG. 14. Trash receptacle 100 comprises support beam/rim 102 and stoppers 103. The stopper 103 is a hole on beam/rim 102 in order to receive a slide latch bolt 231. A receptacle holder 105 that matching trash receptacle 100 is also shown in FIG. 14. Receptacle holder 105 comprises a support bar 106 and two slide latch locks 107. Support bar 106 is one piece of loop structure made from materials such as plastic or metal. Section 230 of support bar 106 is designed to connect to a strap assembly such as strap assembly 47. Two slide latch locks 107 are attached to support bar 106. Slide latch lock 107 is as same as slide latch lock 77 in principle. In this embodiment, the left and right side of support beam/rim 102 and support bar 106 have thin sections in the middle position near slide latch locks 107. This design allows fingers and hands to engage receptacle 100 without pinching fingers.

In the above embodiments, the 3rd and 4th embodiments require a user to secure the trash receptacles intentionally when the user inserts the trash receptacles in the fixtures. This can increase chance of losing trash receptacles when users forget to secure the trash receptacles after putting the trash receptacles in the fixtures. To reduce the chance of losing the trash receptacles, the 1st, 2nd, 5th, 6th and 9th embodiments combine mounting and securing the trash receptacle with the fixture in just one step. When the trash receptacles are inserted in the fixtures properly, trash receptacles are secured automatically.

When a garbage truck is lifting and inverting a garbage cart 20, the truck operator usually monitors the dumping process. To reduce possible misconception of the trash receptacle as hanging garbage, the trash receptacle, the trash receptacle holder and the straps should have a green color close to the organic garbage cart or a black color or a color recommended by garbage management authorities. To alert the operator that a garbage cart has a trash receptacle mounted inside, an alert sign can be attached to the front of the garbage cart.

While the invention has been described in conjunction with the preferred embodiments, features and methods, it should be noted that many alternatives, novel features, novel combination, modifications and variations are apparent to those skilled in the art. Accordingly, the preferred embodiments and description in the invention set forth above are intended to be illustrative and not limiting. Various changes may be made without departing from the spirit and scope of the application.

What is claimed is:

1. An apparatus for holding a trash receptacle in a garbage cart even when said garbage cart is upside down and shaken, comprising:

a holder that can grip and release said trash receptacle;

a plurality of adjustable strap assemblies that can attach said holder to said garbage cart;

wherein said holder includes a plurality of receiving devices that can be attached by said strap assemblies, a support device that can support said trash receptacle, and a plurality of secure devices that can keep said trash receptacle securely attached to said support device even when said garbage cart is upside down and shaken.

2. An apparatus of claim 1, wherein said support device is a loop-shaped structure which engages said trash receptacle by encircling an outside wall under a protruding rim of said trash receptacle.

3. An apparatus of claim 2, wherein said loop-shaped structure is a loop bar.

4. An apparatus of claim 1, wherein at least one of said secure devices is a latch.

5. An apparatus of claim 4, wherein said latch is a spring loaded slide latch.

6. An apparatus of claim 1, wherein at least one of said adjustable strap assemblies includes at least one flexible strap, an adjuster-and-lock and a strap hook that can be attached to a top rim of said garbage cart.

7. An apparatus of claim 1, wherein one of said adjustable strap assemblies includes at least one flexible strap, an adjuster-and-lock, a side release buckle, and a strap hook that can be attached to said top rim of said garbage cart.

8. An apparatus of claim 1, wherein one of said adjustable strap assemblies includes at least one flexible strap, an adjuster-and-lock, a strap hook that can be attached to said top rim of said garbage cart, a strap buckle that is attached to an inside wall of said garbage cart with adhesive materials' and another strap hook that can be attached to said strap buckle.

9. An apparatus of claim 1, wherein said plurality of receiving devices are strap receiving structures that are integrated with said support device.

10. A method for holding one trash receptacle in a garbage cart even when said garbage cart is upside down and shaken, comprising:

providing a holder that can grip and release said trash receptacle, and said holder comprises a plurality of receiving devices that can be attached by adjustable strap assemblies, a support device that can support said trash receptacle, and a plurality of secure devices that can keep said trash receptacle securely attached to said support device even when said garbage cart is upside down and shaken;

utilizing a plurality of said adjustable strap assemblies to connect said holder to said garbage cart securely.

11. A method of claim 10, wherein said utilizing a plurality of adjustable strap assemblies to connect said holder to said garbage cart includes utilizing at least one adjustable strap assembly to support a bottom portion of said trash receptacle by attaching the strap to an inside wall of said garbage cart using an adhesive strap buckle and a strap hook.

12. A method of claim 10, wherein said support device is a loop-shaped structure which engages said trash receptacle by encircling an outside wall under a protruding rim of said trash receptacle.

* * * * *